Figure 1:
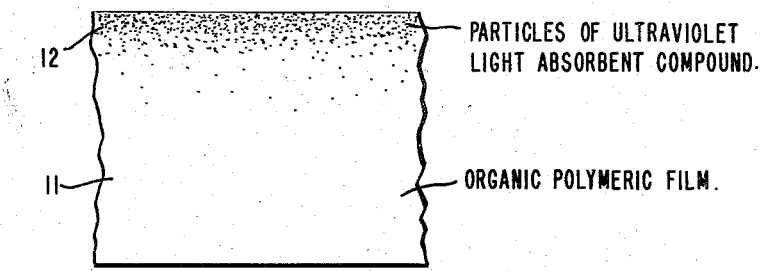

INVENTOR
LEONARD E. AMBORSKI

BY
ATTORNEY

United States Patent Office 3,043,709
Patented July 10, 1962

3,043,709
ORGANIC POLYMERIC STRUCTURE HAVING AN ULTRAVIOLET LIGHT ABSORBENT COMPOUND INCORPORATED THEREIN
Leonard Edward Amborski, Buffalo, N.Y., assignor to E. I. du Pont de Nemours and Company, Wilmington, Del., a corporation of Delaware
Filed July 18, 1958, Ser. No. 750,968
20 Claims. (Cl. 117—7)

This invention relates to organic polymeric structures and particularly to polymeric films suitable for outdoor use.

It is well known that organic polymeric structures such as structures of polyethylene terephthalate, polyethylene, polyoxymethylene, cellulose acetate, polyvinyl chloride, polyvinyl fluoride, etc., when subjected to sunlight, deteriorate rapidly. The ultraviolet rays present in sunlight tend to embrittle the structures and reduce the level of their physical properties substantially.

The use of certain chemical compounds as ultraviolet light absorbers is also well known. Heretofore these compounds have either been incorporated into the polymer melt prior to forming the structure or they have been coated on the surface of the polymeric structure. The first method, incorporating the compound in the melt, distributes the compound throughout the structure. This procedure is both uneconomical and, more important, not completely successful. Much of the harmful radiation penetrates and deteriorates the structure before reaching the too well-distributed absorber. Concentrating the screening agent or absorber on the surface of the structure as in the second method, the coating method, offers much more effective protection. However, difficulties are usually encountered in adhering the coatings to the surface of the structure. The coatings may not adhere well, or if they do adhere, they often cannot be applied without forming streaks. Furthermore, the coating, which usually contains a polymeric material, may also tend to be degraded by ultraviolet light and peel from the base structure.

It is an object of this invention to provide weather-resistant organic polymeric shaped structures, particularly films suitable for outdoor use. It is a further object to provide a process for incorporating ultraviolet absorbent compounds into the polymeric structure so that the compounds are concentrated uniformly at the surface of the structure and are firmly attached to the structure. Other objects will appear hereinafter.

The objects are accomplished by a process which comprises applying an ultraviolet light absorbent compound having a melting point lower than the melting point of the base structure and being compatible therewith to the surface of a base structure, and then heating the structure to a temperature above the melting point of the ultraviolet light absorbent compound and below the melting point of the base structure.

Figure 2:
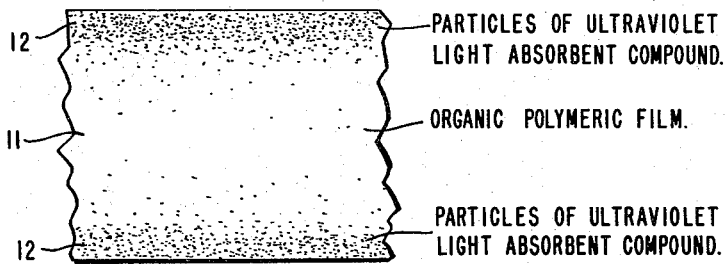

The invention will be more clearly understood by referring to the following detailed description in conjunction with the drawings, in which:

FIGURE 1 illustrates one embodiment of the present invention; and
FIGURE 2 illustrates another embodiment of the present invention.

In FIGURE 1 is illustrated an organic polymeric film of the present invention that is weather-resistant (resistant to degradation by ultraviolet light) for exposure of one surface. Reference numeral 11 represents the film and reference numeral 12 represents the particles of ultraviolet light absorbent compound distributed adjacent to the surface of the film. The concentration of particles, as shown in FIGURE 1, is a maximum adjacent to the surface and decreases substantially to zero within a distance of no greater than about 20% of the thickness of the film. For the results of the present invention, it is necessary to distribute the ultraviolet light absorbent compound within the limits of the aforementioned depth to the extent of at least 0.4 gram per square meter of the film. Thus, the remaining thickness of the film, at least 80%, is substantially free of particles. In the case of polymeric film it is preferred to maintain the ultraviolet light absorbent compound substantially completely within a distance of 0.1 mil (.0001 inch) of the surface. Therefore, the preferred minimum thickness of the polymeric film of the present invention is 0.5 mil (.0005 inch).

FIGURE 2 illustrates a film that is weather-resistant for exposure of both surfaces. The ultraviolet light absorbent particles 12 are distributed adjacent to both surfaces. The same limitations, as mentioned previously, prevail for this film. The concentration adjacent to each surface is 0.4 gram per square meter, of the film and is limited substantially to no greater than 20% of the thickness adjacent to each surface. Thus, at least 60% of the thickness at the center is substantially free of particles. For the preferred film having a minimum thickness of 0.5 mil, the particles are limited to substantially 0.1 mil from each surface of the film, i.e., a total of 0.2 mil of the film thickness.

The invention will be described for organic polymeric films, particularly polyethylene terephthalate film. However, it is applicable to shaped structures such as fabrics, filaments, tubing, molded objects and the like wherein the aforementioned conditions can be met.

"Compatibility," as used in the present specification, is determined by the following test. A solution of the ultraviolet light absorbent compound is applied to the surface of a base film of known weight. The solvent is permitted to evaporate leaving a coating of approximately 1 gram of the absorber per square meter of film. The coated film is heated for ½ to 1 hour at a temperature between the melting points of the absorber and the base film. The resulting film is weighed to determine how much of the compound has been absorbed. It is then dipped twice, each time for 5 seconds, in a solvent for the absorber. After drying, the film is weighed again. If no substantial weight is lost by dipping, the ultraviolet light absorbent compound is deemed "compatible" with the base film.

The ultraviolet light absorbent compound useful in the present invention, besides being compatible with the base film and having a melting point below that of the base film, must also:

(1) Have a high absorptive capacity for light in the ultraviolet range (wave lengths of 200–400 millimicrons) and transmit no more than 10% of the light at a wave length of 390 millimicrons.
(2) Be able to dissipate absorbed energy in a manner that neither physically damages nor colors the base polymeric film.
(3) Be stable against destruction by absorbed energy.
(4) Resist the action of water.
(5) Be substantially free from odor and color.

The most important compounds fulfilling the above requirements are substituted benzophenone derivatives having the formula

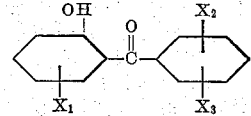

wherein $X_1$, $X_2$ and $X_3$ are selected from the group consisting of hydrogen, hydroxy, alkyl, alkoxy and halogen. The preferred substituted benzophenone derivatives include 2,2' - dihydroxy - 4,4' - dimethoxybenzophenone;

2,2',4,4'-tetrahydroxybenzophenone; 2-hydroxy - 4,4' - dimethoxybenzophenone; 2,4-dihydroxybenzophenone; 2-hydroxy - 4 - methoxybenzophenone; 2,2' - dihydroxybenzophenone; and 2,2'-dihydroxy-4,4'-diethoxybenzophenone. The most outstanding is a mixture of benzophenone derivatives known as "Uvinul" 490.[1] These compounds are compatible with substantially all the useful organic polymeric films and, having melting points between 120° and 170° C., melt at temperatures substantially below the useful organic polymeric films.

The process of the invention involves applying the ultraviolet light absorbent compound to the base film in one of a variety of methods. The compounds may be applied from a solution; from a dispersion such as a dispersion in water; as a solid in the form of a powder or dust; or as a liquid in the form of a melt.

In the next step, the coated film is heated to a temperature above the melting point of the absorber and below the melting point of the base film. In the case of the substituted benzophenone derivatives, this temperature may be anywhere from about 115° C. to about 200° C. The exposure time used in this step need only be long enough for the compound to be absorbed into the film surface. For the substituted benzophenone derivatives, the exposure time may vary from 15 seconds to 30 minutes, preferably at least 2 minutes, depending upon the particular benzophenone derivative, the base film, the coating weight, the particular temperature selected, etc. A coating weight of at least 0.4 gram per square meter has been found most desirable when using the substituted benzophenone derivatives. Improvement may be obtained by increasing coating weights to a weight of approximately 1.0 gram per square meter. Although coating weights greater than 1.0 gram per square meter can be used, they are not necessary in the present invention.

The invention will be more clearly understood by referring to the descriptive material and the examples which follow. It is understood that the examples, although illustrating specific embodiments of the present invention, should not be considered limitative. Because of the commercial importance and the widespread use of polyethylene terephthalate film in outdoor applications, the description of the invention will mostly concern treating polyethylene terephthalate film.

The untreated polyethylene terephthalate film may be prepared in the manner described in U.S. Patent 2,465,319 to Whinfield and Dickson, by the condensation of ethylene glycol and terephthalic acid, preferably by an ester interchange between ethylene glycol and a dialkyl ester terephthalic acid such as dimethyl terephthalate. Of particular interest is oriented, heat-set polyethylene terephthalate film which is prepared by stretching and/or rolling the film in two directions to at least 2 times, preferably 2.5 to 4 times, the original dimensions of the film and then heating the film to an elevated temperature of about 150°–250° C. while restricting dimensional change, usually by holding it under tension. The oriented, heat-set polyethylene terephthalate film is clear, impact resistant, insensitive to moisture, tough and very strong; in short, the film possesses most of the physical and chemical properties that make it ideal for glazing and other outdoor applications. With the present invention which imparts resistance to degradation by ultraviolet light, the film is virtually ideal for the aforementioned purposes.

The invention is also applicable to most non-fibrous and fibrous flexible, transparent, organic, polymeric sheet materials and to molded articles of polymeric materials. Such polymeric materials include the cellulosic materials such as regenerated cellulose, hydroxyethyl cellulose, carboxymethyl cellulose, amylose, cellulose acetate, ethyl cellulose, cellulose nitrate; polyethylene, polyoxymethylene, polyvinyl chloride, polyvinyl fluoride, etc. or films and fabrics formed from mixtures of these or films and fabrics coated with any of these materials.

EXAMPLES I–V

Polyethylene terephthalate film was oriented by stretching in two directions to 3 times its original dimensions. The oriented film was then heat-set by heating it to a temperature of 220±5° C. while holding the film under tension. The polyethylene terephthalate film, 5 mils (.005 inch) thick, was cut into 10" x 10" sheets and weighed.

The sheets were dipped into a solution of about 5% "Uvinul" 490 in methyl ethyl ketone. The solvent evaporated quickly leaving a thin, evenly distributed "Uvinul" 490 coating which was tacky.

The samples were heated in an oven maintained at a temperature of 130±15° C. After 30 minutes the surface of the film was smooth and dry, essentially the same as untreated film. The treated samples were weighed to determine the amount of "Uvinul" 490 that had been absorbed by the samples.

The samples were exposed to Florida sunshine on an open frame rack at an angle of 45° facing south for one year. A comparison of the physical properties of polyethylene terephthalate film coated with from 0.1 to 2.45 grams per square meter prior to and after exposure are presented in Table 1.

In this table and subsequent tables of the specification, three properties are used to determine the extent of degradation caused by ultraviolet light. Tensile strength and elongation are well known to those skilled in the art and are measured in the conventional manner. Intrinsic viscosity is a measure of the degree of polymerization and is defined as the limit of $v/C$ as C approaches zero, where $v=$ (viscosity of solution of polymer in a phenol-tetrachloroethane solvent—viscosity of solvent)/viscosity of solvent. By plotting several values of $v/C$ versus C and extrapolating to zero concentration, the intrinsic viscosity is obtained. A decrease in this value indicates the occurrence of degradation.

*Table 1*

PHYSICAL PROPERTIES OF FILMS OF INVENTION COMPARED TO A CONTROL

| Ex. | Weight of absorber (gram/sq. meter) | Tensile strength (lbs./sq. in. x $10^{-3}$) | | Percent elongation | | Intrinsic viscosity | |
|---|---|---|---|---|---|---|---|
| | | Initial | 1 year | Initial | 1 year | Initial | 1 year |
| Control | 0 | 23.7 | 1.0 | 118 | 0 | 0.57 | 0.40 |
| I | 0.2 ±.1 | 23.0 | 16.6 | 110 | 26 | 0.57 | 0.49 |
| II | 0.3 ±.1 | 23.0 | 17.5 | 110 | 30 | 0.57 | 0.50 |
| III | 0.5 ±.05 | 23.0 | 23.0 | 110 | 95 | 0.57 | 0.54 |
| IV | 1.1 ±.06 | 23.0 | 22.9 | 110 | 108 | 0.57 | 0.54 |
| V | 2.25±.2 | 23.0 | 23.0 | 110 | 110 | 0.57 | 0.55 |

In the following three examples, Examples VI–VII, an accelerated weathering test was used. Samples prepared in the manner described for Example I were placed in a constant temperature box which was maintained at 55° C. These samples were exposed while on a 33⅓ revolutions per minute turntable to the ultraviolet light produced by five Westinghouse FS–20–T–12 fluorescent sun lamps.

EXAMPLE VI

An oriented, heat-set polyethylene terephthalate film, 5 mils (.005 inch) thick, was treated as in Example I to contain 2.3 grams per square meter of "Uvinul" 490. In the accelerated weathering test this sample remained clear and tough after 8,254 hours of exposure compared to an untreated control which degraded substantially after 200 hours of exposure.

EXAMPLE VII

Oriented, heat-set polyethylene terephthalate film samples, 1 mil (.001 inch) thick, were treated as in Example I

---

[1] A mixture of 2,2'-dihydroxy-4,4'-dimethoxybenzophenone and 2,2',4,4'-tetrahydroxybenzophenone, manufactured by General Aniline and Film Corp.

to contain 0.56–0.75 gram per square meter of "Uvinul" 490. In the accelerated weathering test these samples remained clear and tough after an average of 5,000 hours of exposure compared to an untreated control which deteriorated completely after 116 hours of exposure.

EXAMPLE VIII

An oriented, heat-set polyethylene terephthalate film, 0.5 mil (.0005 inch) thick, was treated as in Example I to contain .65 gram per square meter of "Uvinul" 490. In the accelerated weathering test this sample remained clear and tough after 1,296 hours of exposure compared to an untreated control which deteriorated completely after 54 hours of exposure.

EXAMPLES IX–XI

In these examples, a melt-printing procedure was used to apply the ultraviolet light absorbent compound to an oriented, heat-set polyethylene terephthalate film. The film, 5 mils (.005 inch) thick, was unwound at a speed of 40 feet per minute into the nip of two rolls. The lower, smooth surfaced print roll was an internally oil-heated, chromium-plated roll which dipped into a pan of molten "Uvinul" 490. The "Uvinul" 490 was maintained at a temperature between 115° and 120° C. A doctor knife was placed in position to remove the excess "Uvinul" 490 picked up by the roll. The upper roll was a rubber back-up roll. After passing through the nip of these rolls and past the doctor knife, the coated web was led through a 24-foot dryer whose temperature was maintained between 150° and 165° C.

For Examples X and XI, a similar procedure was used for oriented, heat-set polyethylene terephthalate films of thicknesses of .003 inch and .001 inch, respectively. The properties of the resulting films over a six-month period of exposure to Florida sunshine compared to untreated controls are presented in Table 2.

EXAMPLE XII

In this example, the solution-printing procedure was used to apply the ultraviolet light absorbent compound to oriented, heat-set polyethylene terephthalate film varying in thickness from .005 inch to .0075 inch. The equipment was substantially the same as described for Example IX. The print roll was dipped into a pan containing a 25% solution of "Uvinul" 490 in methyl ethyl ketone. Both the roll and the solution of "Uvinul" 490 were unheated. A doctor knife was used to remove any excess "Univul" 490 solution picked up by the roll. The coated web was then passed through a dryer maintained at a temperature between 180° and 190° C. The web speed varied from 33–107 feet per minute depending on the thickness of the film. The amount of "Uvinul" 490 retained by the polyethylene terephthalate film was 0.57 gram per square meter. The resulting film was clear and had a good appearance. In the accelerated weathering test, the film deteriorated after 2,088 hours of exposure compared to an untreated control which deteriorated after 116 hours.

EXAMPLES XIII–XV

In these examples, oriented, heat-set polyethylene terephthalate film was treated with a solution of "Uvinul" 490 by means of a dip-doctor roll procedure. The film, 5 mils (.005 inch) thick for Example XIII, was unwound from a storage roll and led over a guide roll into a dip tank. After passing around a dip bar submerged in the tank, the film passed between the nip of two doctor rolls above the tank which served to remove excess solution from the surface of the web and to smooth the remaining solution over the surface. The treated web was then led through a drying tower maintained between a temperature of 135° C. at the entry to about 90° C. near the exit. The web speed was 34 feet per minute; the heat-treating time was two minutes; and the concentration of the solution was 3.3% "Uvinul" 490 in methyl ethyl ketone.

For Examples XIV and XV, oriented, heat-set polyethylene terephthalate films having thicknesses of .003 inch and .001 inch, respectively, were used. The properties of the resulting films after a six-month period of exposure to Florida sunlight compared to untreated controls are presented in Table 3.

*Table 3*

PHYSICAL PROPERTIES OF FILMS OF INVENTION COMPARED TO CONTROLS

| Example | Weight of absorber (gram/sq. meter) | Tensile strength (lbs./sq. in. x $10^{-3}$) | | Percent elongation | | Intrinsic viscosity | |
|---|---|---|---|---|---|---|---|
| | | Initial | 6 mo. | Initial | 6 mo. | Initial | 6 mo. |
| XIII | 0.25 | 20.3 | 15.5 | 64 | 26 | 0.56 | 0.50 |
| Control A | 0 | 20.7 | 0 | 100 | 0 | 0.56 | 0.41 |
| XIV | 0.25 | 24.1 | 17.8 | 100 | 35 | 0.57 | 0.51 |
| Control B | 0 | 23.2 | 0 | 103 | 0 | 0.57 | 0.38 |
| XV | 0.39 | 19.3 | 17.7 | 51 | 44 | 0.56 | 0.48 |
| Control C | 0 | 19.3 | 0 | 70 | 0 | 0.59 | 0 |

*Table 2*

PHYSICAL PROPERTIES OF FILMS OF INVENTION COMPARED TO CONTROLS

| Example | Weight of absorber (gram/sq. meter) | Tensile strength (lbs./sq.in. x $10^{-3}$) | | | | Percent elongation | | | | Intrinsic viscosity | | | |
|---|---|---|---|---|---|---|---|---|---|---|---|---|---|
| | | Initial | 1 mo. | 3 mo. | 6 mo. | Initial | 1 mo. | 3 mo. | 6 mo. | Initial | 1 mo. | 3 mo. | 6 mo. |
| IX | 0.51 | 20.8 | 18.4 | 16.6 | 20.3 | 67 | 46 | 27 | 27 | 0.57 | 0.60 | 0.55 | 0.44 |
| Control A | 0 | 27.0 | 14.2 | 12.6 | ¹0 | 120 | 7 | 2 | ¹0 | 0.55 | 0.495 | 0.48 | 0.35 |
| X | 0.56 | 21.0 | 18.4 | 19.4 | 14.5 | 58 | 33 | 39 | 9 | 0.53 | 0.52 | 0.50 | 0.51 |
| Control B | 0 | 30.2 | 19.2 | 16.1 | ¹0 | 132 | 44 | 5 | ¹0 | 0.56 | 0.485 | 0.41 | 0.36 |
| XI | 0.57 | 20.7 | 17.1 | 16.8 | 18.1 | 76 | 42 | 28 | 28 | 0.57 | 0.53 | 0.54 | 0.51 |
| Control C | 0 | 21.1 | 13.0 | ¹0 | ¹0 | 106 | 3 | ¹0 | ¹0 | 0.56 | 0.385 | ¹0 | ¹0 |

¹ Deteriorated completely—These films were so brittle that they broke before testing.

EXAMPLES XVI–XVIII

In these examples, samples of oriented, heat-set polyethylene terephthalate film were dipped into a solution of "Uvinul" 490 in methyl ethyl ketone. The solution was maintained at an elevated temperature to cause the ultraviolet light absorbent compounds, "Uvinul" 490, to penetrate the surface of the film. The film thickness in Example XVI was .005 inch; in Example XVII, .003 inch; and in Example XVIII, .001 inch. The coating weights of the samples were varied as shown in Table 4 by changing the solution temperature from 125° C. to 155° C.; the dip time from 30 seconds to 90 seconds; and the concentration of the solution between 3% and 11%.

The physical properties of the treated film samples were averaged and are compared to the properties of untreated controls over a period of six months exposure to Florida sunshine in Table 4.

Table 4
PHYSICAL PROPERTIES OF FILMS OF INVENTION COMPARED TO CONTROLS

| Example | Weight of absorber (gram/sq. meter) | Tensile strength (lbs./sq.in. x 10⁻³) | | | | Percent elongation | | | | Intrinsic viscosity | | | |
|---|---|---|---|---|---|---|---|---|---|---|---|---|---|
| | | Initial | 1 mo. | 3 mo. | 6 mo. | Initial | 1 mo. | 3 mo. | 6 mo. | Initial | 1 mo. | 3 mo. | 6 mo. |
| XVI | 0.46–0.79 | 26.8 | 20.1 | 19.5 | 25.8 | 119 | 56 | 69 | 109 | 0.55 | 0.59 | 0.55 | 0.42 |
| Control A | 0 | 27.0 | 14.2 | 12.6 | 0 | 120 | 7 | 2 | 0 | 0.55 | 0.495 | 0.48 | 0.35 |
| XVII | 0.43–0.75 | 31.2 | 21.9 | 25.8 | 24.4 | 134 | 58 | 108 | 74 | 0.56 | 0.60 | 0.57 | 0.53 |
| Control B | 0 | 30.2 | 19.2 | 16.1 | 0 | 132 | 44 | 5 | 0 | 0.56 | 0.485 | 0.41 | 0.36 |
| XVIII | 0.43–0.63 | 25.7 | 17.4 | 17.1 | 15.6 | 121 | 17 | 36 | 34 | 0.53 | 0.50 | 0.51 | 0.48 |
| Control C | 0 | 21.1 | 13.0 | 0 | 0 | 106 | 3.0 | 0 | 0 | 0.56 | 0.385 | 0 | 0 |

EXAMPLE XIX

An aqueous dispersion was prepared by ball milling for 16 hours the following ingredients:

30 parts of 2,2'-dihydroxy-4,4'-dimethoxybenzophenone
55 parts of water
15 parts of "Blancol" [1]

The dispersion was diluted further with about 500 parts of water to provide a dispersion containing about 5% of the benzophenone.

Samples of oriented, heat-set polyethylene terephthalate film, .005 inch thick, were dip-coated with the dispersion and then heated to a temperature of 135°–145° C. for a period of two minutes. Excess absorber was washed from the film surface with distilled water.

The film, containing 0.4 gram per square meter of the absorber on each side, was tested by measuring the intensity of the light transmitted through the film. Substantially all light below a wave length of 390 millimicrons was screened out by the absorber and was not transmitted through the film.

EXAMPLE XX

Example XIX was repeated substituting "Uvinul" 490 for 2,2'-dihydroxy-4,4'-dimethoxybenzophenone in the previous dispersion. The results were identical. Substantially all ultraviolet light was screened out by the use of 0.5 gram of "Uvinul" 490 per square meter on each side of the oriented, heat-set polyethylene terephthalate film. It was also noted that 77% of the "Uvinul" 490 was removed by scraping off 0.1 mil from each surface.

EXAMPLE XXI

Samples of cellulose acetate film, 1.2 mils (.0012 inch or 120 gauge) thick, were dipped into a 2½% solution of "Uvinul" 490 in ethanol. The samples were dried at room temperature, then heated in an oven for 30 minutes at 130° C. The samples, containing an average of 1.1 grams of absorber per square meter (total for both sides), were given the accelerated weathering test as described in Examples VI–VIII. The treated samples endured an average of 1,110 hours before cracking or creasing compared to an average of 170 hours for untreated control samples.

EXAMPLE XXII

Samples of polyethylene film, 2 mils (.002 inch or 200 gauge) thick, were dipped into a 2½% solution of "Uvinul" 490 in ethanol. The samples were dried at room temperature, then heated in an oven for 5–10 minutes at 120° C. The samples, containing an average of 1.1 grams of absorber per square meter (total for both sides), underwent the accelerated weathering test as described previously. The treated samples endured an average of 1,090 hours before failing, which was indicated by a loss of elongation, compared to an average of 760 hours for untreated control samples.

EXAMPLE XXIII

Samples of polyvinyl chloride film, 1 mil (.001 inch) thick, were dipped into a 2½% solution of "Uvinul" 490 in ethanol. The samples were then dried at room temperature and heated in an oven for 30 minutes at 130° C. The samples, containing an average of 1.1 grams of absorber per square meter (total for both sides), next underwent the accelerated weathering test as described previously. The treated samples endured an average of 900 hours before failure as indicated by loss of elongation compared to an average of 220 hours for untreated control samples.

EXAMPLE XXIV

Samples of polyvinyl fluoride film, 0.001 inch thick, were dipped into a solution containing 25 parts "Uvinul" 490, 25 parts benzene, and 150 parts methyl ethyl ketone. Polyvinyl fluoride film had been prepared in accordance with procedures described in U.S. Patent 2,419,010. Excess solution was wiped from the film and the film was dried. Heating the coated film for two minutes in an oven at 180° C. caused the ultraviolet light absorbent compounds to penetrate the surface. The film samples, containing an average of 0.8 grams of absorber per square meter, were subjected to the accelerated weathering test as described previously. The treated samples endured an average of 5,600 hours before failure compared to an average of 2,300 hours for untreated control samples.

EXAMPLE XXV

This example illustrates most vividly the important aspects of the present invention. Polyethylene terephthalate films prepared in accordance with the present invention are compared with three controls:

Control A—polyethylene terephthalate film having the ultraviolet absorber incorporated throughout the polymer;

Control B—polyethylene terephthalate film having the ultraviolet absorber in a polymeric composition coated on the film;

Control C—untreated polyethylene terephthalate film, oriented and heat-set as described hereinafter.

In this example, 0.005 inch thick polyethylene terephthalate film, oriented by stretching 3× in both directions and heat-set at 200° C., was surface-penetrated with "Uvinul" 490. A 2.2% "Uvinul" 490 solution in methyl ethyl ketone was applied to the film in the manner described in Example I. The film was air dried and then heated in an oven at a temperature of 130°–150° C. for 30 minutes. The film had an absorber weight of 0.7 gram per square meter penetrated into the surface on each side of the film.

The film of the invention was compared to the several controls after they had been exposed to Florida sunshine over a period of 18 months. The results are given in Table 5.

Control A was prepared in a laboratory autoclave in accordance with the process described in U.S. Patent 2,465,319 to Whinfield and Dickson. 0.62% "Uvinul" 490 was added to the polymer mixture before substantial polymerization had taken place. The finished polymer was extruded in the form of a film, quenched and subsequently oriented by stretching the film in both the longitudinal and transverse directions to an extent of 3 times its initial length. The film was then heat-set under ---
[1] A wetting agent manufactured by Antara Chemical Corp.

tension at 200° C. The film contained 1.09 grams of absorber per square meter.

Control B was prepared by coating oriented, heat-set, polyethylene terephthalate film with a cellulose acetate butyrate coating composition containing 30% "Uvinul" 490 from a solution in methyl ethyl ketone.

*Table 5*

PHYSICAL PROPERTIES OF FILM OF INVENTION COMPARED TO CONTROLS

| Example | Tensile strength (lbs./sq.in. x 10⁻³) | | | | | Percent elongation | | | | | Intrinsic viscosity | | | | |
|---|---|---|---|---|---|---|---|---|---|---|---|---|---|---|---|
| | Initial | 3 mo. | 6 mo. | 12 mo. | 18 mo. | Initial | 3 mo. | 6 mo. | 12 mo. | 18 mo. | Initial | 3 mo. | 6 mo. | 12 mo. | 18 mo. |
| XXV | 20.0 | | | 19.0 | 18.7 | 85 | | | 80 | 75 | 0.54 | | | | 0.51 |
| Control A | 20.0 | | 14.4 | 11.9 | 11.0 | 86 | | 20 | 4 | | 0.53 | | | 0.49 | |
| Control B | 19.0 | 20.0 | 9.5 | | | 58 | 60 | 5 | | | 0.56 | 0.56 | 0.36 | | |
| Control C | 21.9 | 5.2 | | 5.0 | 0 | 82 | | 2 | 1 | 0 | 0.55 | | 0.47 | 0.39 | |

EXAMPLE XXVI

This example shows the effectiveness of the process of this invention as applied to shaped structures of high molecular weight polyoxymethylene. Uncolored polyoxymethylene having a number average molecular weight of about 40,000 was fabricated into bars 5″ x ½″ x ⅛″. The bars were immersed in molten P-35 [2] for a few minutes, dried at 150° to 165° C., and subjected to the accelerated weathering test. The samples endured an average of 2000 hours before any haze, which could be detectable by the unaided eye, developed on the surface of the bars.

As a control, 1 part by weight of P-35 was incorporated throughout 99 parts by weight of the above-described polyoxymethylene. The mixture was fabricated into similar bars, 5″ x ½″ x ⅛″. These bars, upon being subjected to the accelerated weathering test, developed a surface haze after 500 hours of exposure.

Bars of polyoxymethylene, which did not contain any ultraviolet light absorbent compound, developed a surface haze between 50–100 hours in the accelerated weathering test.

To determine the effectiveness of the process in achieving penetration of ultraviolet light absorber into the polymer product, the polyoxymethylene was fabricated into blocks 1″ x 1″ x 1½″. The blocks were treated with P-35 by the technique described above. One mil slices were successively removed from one side of each block, and the average concentration of P-35 in each slice was measured to determine the total amount of P-35 which had been absorbed, and to determine the depth to which the P-35 had penetrated.

It was found that approximately 1.4 grams of P-35 had been absorbed per square meter of surface area of the blocks as originally treated, and that the P-35 had penetrated approximately 2% of the total depth of the blocks. The following table shows the average concentration of the P-35 as successive cuts were removed from the surface of the blocks.

*Table 6*

| Slice number | Thickness of slice (mils) | Concentration of P-35 in slice (percent by weight) | Total depth of cut into sample | |
|---|---|---|---|---|
| | | | Expressed in mils | Expressed as percent of total depth of sample |
| 1 | 1.5 | 0.93 | 1.5 | 0.3 |
| 2 | 1.0 | 0.65 | 2.5 | 0.5 |
| 3 | 1.0 | 0.70 | 3.5 | 0.7 |
| 4 | 1.0 | 0.45 | 4.5 | 0.9 |
| 5 | 1.0 | 0.45 | 5.5 | 1.1 |
| 6 | 1.0 | 0.38 | 6.5 | 1.3 |
| 7 | 1.0 | 0.29 | 7.5 | 1.5 |
| 8 | 1.0 | 0.10 | 8.5 | 1.7 |
| 9 | 1.0 | 0.06 | 9.5 | 1.9 |

[2] 2 hydroxy-4-methoxy-4′-chlorobenzophenone, manufactured by General Aniline and Film Corp.

EXAMPLE XXVII

Samples of polyoxymethylene which had been colored red, yellow, and pastel green and blue were fabricated into bars 5″ x ½″ x ⅛″. One-half of the long portion of these colored bars were treated by the process described in Example XXVI, and the bars were subjected to 300 hours exposure at accelerated weathering conditions. The treated halves of the bars showed no color change that could be detected by the unaided eye, while the untreated halves showed severe crazing.

The importance of the "surface penetration" technique to obtain at least about 0.4 gram per square meter of the ultraviolet light absorbent compound into the surface of the organic polymeric structure is illustrated by the foregoing examples. The outstanding results obtained with a heat-set polyethylene terephthalate film oriented in both directions is apparent from the examples. It should be mentioned that the ultraviolet light absorbent compound can be applied and made to penetrate the surface of such a film, not only after biaxial orientation and heat-setting have been performed, but during the formation of such a film. For example, an unoriented or unidirectionally stretched polyethylene terephthalate film may be treated with the absorber and heated to cause penetration, and thereafter the unoriented film may be stretched in two directions and heat-set or the one-way stretched film may be stretched in the other direction and heat-set. To obtain the ultimately desired weight in the final product, a greater than normal amount of the absorber would be applied initially in both these cases.

The most useful absorbers are the substituted benzophenone derivatives of the formula

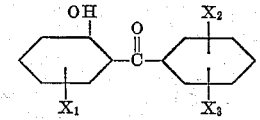

wherein $X_1$, $X_2$ and $X_3$ are selected from the group consisting of hydrogen, hydroxy, alkyl, alkoxy and halogen, as disclosed previously. A list of others that are considered useful in the process of the present invention follows:

2,2′-dihydroxybenzophenone;
2,2′,4,4′-tetrahydroxybenzophenone;
2,2′-dihydroxy-4,4′-dimethoxybenzophenone;
2,2′-dihydroxy-4,4′-diethoxybenzophenone;
2,2′-dihydroxy-4,4′-dipropoxybenzophenone;
2,2′-dihydroxy-4,4′-dibutoxybenzophenone;
2,2′-dihydroxy-4-methoxy-4′-ethoxybenzophenone;
2,2′-dihydroxy-4-methoxy-4′-propoxybenzophenone;
2,2′-dihydroxy-4-methoxy-4′-butoxybenzophenone;
2,2′-dihydroxy-4-ethoxy-4′-propoxybenzophenone;
2,2′-dihydroxy-4-ethoxy-4′-butoxybenzophenone;
2,3′-dihydroxy-4,4′-dimethoxybenzophenone;
2,3′-dihydroxy-4-methoxy-4′-butoxybenzophenone;
2-hydroxy-4,4′,5′-trimethoxybenzophenone;
2-hydroxy-4,4′,6′-tributoxybenzophenone;
2-hydroxy-4-butoxy-4′,5′-dimethoxybenzophenone;
2-hydroxy-4-ethoxy-2′,4′-dibutylbenzophenone;
2-hydroxy-4-propoxy-4′,6′-dichlorobenzophenone;
2-hydroxy-4-propoxy-4′-6′-dibromobenzophenone;
2,4-dihydroxybenzophenone;

2-hydroxy-4-methoxybenzophenone;
2-hydroxy-4-ethoxybenzophenone;
2-hydroxy-4-propoxybenzophenone;
2-hydroxy-4-butoxybenzophenone;
2-hydroxy-4-methoxy-4'-methylbenzophenone;
2-hydroxy-4-methoxy-4'-ethylbenzophenone;
2-hydroxy-4-methoxy-4'-propylbenzophenone;
2-hydroxy-4-methoxy-4'-butylbenzophenone;
2-hydroxy-4-methoxy-4'-tertiary butylbenzophenone;
2-hydroxy-4-methoxy-4'-chlorobenzophenone;
2-hydroxy-4-methoxy-2'-chlorobenzophenone;
2-hydroxy-4-methoxy-4'-bromobenzophenone;
2-hydroxy-4,4'-dimethoxybenzophenone;
2-hydroxy-4,4'-dimethoxy-3-methylbenzophenone;
2-hydroxy-4,4'-dimethoxy-2'-ethylbenzophenone;
2-hydroxy-4,4',5'-trimethoxybenzophenone;
2-hydroxy-4-ethoxy-4'-methylbenzophenone;
2-hydroxy-4-ethoxy-4'-ethylbenzophenone;
2-hydroxy-4-ethoxy-4'-propylbenzophenone;
2-hydroxy-4-ethoxy-4'-butylbenzophenone;
2-hydroxy-4-ethoxy-4'-methoxybenzophenone;
2-hydroxy-4,4'-diethoxybenzophenone;
2-hydroxy-4-ethoxy-4'-propoxybenzophenone;
2-hydroxy-4-ethoxy-4'-butoxybenzophenone;
2-hydroxy-4-ethoxy-4'-chlorobenzophenone;
2-hydroxy-4-ethoxy-4'-bromobenzophenone, and the like.

From this illustration of representative compounds, it is apparent that the 3, 4, 5, 6, 2', 3', 4', 5' and 6' positions in the above structural formula may be unsubstituted or there may be either one or two substituents from the various categories mentioned previously. These substituents include methyl, ethyl, propyl, butyl, methoxy, ethoxy, propoxy, butoxy, or hydroxy radicals or a chlorine, bromine, iodine or fluorine atom.

Other ultraviolet light absorbent compounds besides the substituted benzophenone derivatives which are useful in the present invention include the chrome complex of p-aminobenzoic acid, phenyl salicylate, resorcinol and substituted benzotriazoles.

The shaped articles of the present invention, particularly those wherein an oriented, heat-set polyethylene terephthalate film is the base film, may be used in a multitude of outdoor applications. Among these applications are as plastic glazing materials for use in farm buildings, warehouses, greenhouses, radomes, potting beds, chicken coops, temporary living quarters, perforated window screens, coverings to replace storage structures, e.g., silos, etc.; as glass replacement materials in semi-permanent light-weight aluminum type storm windows, windows for convertible automobiles, trailers, portable windows for marine use, aircraft, outdoor telephone booths; in laminations to other materials such as plywood, aluminum, steel, fabrics, etc., used for outdoor furniture, outdoor signs, awnings, Venetian blinds, automobile trim, automobile convertible tops, traffic markers, automobile accessories, wrapping for electric wires for outdoor use, etc.; as transparent covers for farming purposes such as hot caps for plants, vegetables and other crops to afford protection from frost, wind, hail, etc., protective coverings and tarpaulins for boats, automobiles, motorcycles and other vehicles, athletic fields, covering for airplane wings and fuselage, coverings for growing bananas, fumigation blankets for killing insects and bacteria in the soil, ground coverings for mulching, tree trunk wrap to exclude boring insects, liners for water storage ponds, tank liners and crop covers for hydroponics farming installations, protective shrouds for outdoor depot-type stock pilings, automobile tire wrap, etc.; as lining materials for irrigation ditches, rain gutters, pipe and wire wrap, outdoor pools and tanks, marine cordage, high altitude balloons, boat sails, etc.; as packaging or wrapping material where the material wrapped is subjected to outdoor weather conditions and other corrosive attack, such as protective coverings for plastic foam structures of all varieties, fabrics for harvesting sacks, etc.; as fabric replacement materials such as upholstery material in converticle automobiles, fabric for umbrellas and miscellaneous rainwear, beach sandals, beach umbrellas, material for outer wear, window shades, life rafts, life jackets, etc.; as tubing for hoses, ground sprinkles, etc. and in the form of molded articles to be subjected to outdoor weather conditions.

While the invention contemplates the use of ultraviolet light absorbers as the essential addition to the base structures, other ingredients may be added if desired. The addition of pigments, dyes, delusterants, fillers, binders, plasticizers, etc., is therefore understood to be within the purview of this invention. The films of the present invention may also be successfully metallized. Preferably, the film is surface-penetrated with the ultraviolet light absorbed on one side of the film and then metallized on the other side. Thus, metallized film useful for protective and decorative purposes may be made resistant to ultraviolet light. Such metallized films may used in automobile decorative applications such as exterior decorative panels and roof surfaces, decals for outside use as in gasoline pumps, exterior signs, outdoor furniture and in decorative panels for machines used outside such as soft drink or cigarette dispensing machines.

This application is a continuation-in-part of my copending application Serial No. 675,683, filed August 1, 1957 now abandoned.

As many widely different embodiments may be made without departing from the spirit and scope of this invention, it is understood that the invention is not limited except as defined in the appended claims.

What is claimed is:

1. An organic polymeric shaped structure having accumulated therein and adjacent to at least one surface thereof to a penetration of not more than about 20% of the cross-section of said structure from said surface, at least 0.4 gram of an ultraviolet light absorbent compound per square meter of surface of said structure, said compound being compatible with said structure and having a melting point below that of said structure.

2. An organic polymeric film at least 0.5 mil thick having accumulated therein and adjacent to at least one surface thereof to a depth of not more than about 0.1 mil from said surface, at least 0.4 gram of an ultraviolet light absorbent compound per square meter of surface of said film, said compound being compatible with said film and having a melting point below that of said film.

3. An organic polymeric shaped structure having accumulated therein and adjacent to at least one surface thereof to a penetration of not more than about 20% of the cross-section of said structure from said surface, at least 0.4 gram per square meter of surface of said structure of a substituted benzophenone derivative having the formula

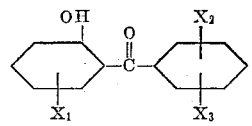

wherein $X_1$, $X_2$ and $X_3$ are each selected from the group consisting of hydrogen, hydroxy, alkyl, alkoxy and halogen.

4. A product as in claim 3 wherein the organic polymeric shaped structure is polyethylene terephthalate film.

5. A product as in claim 3 wherein the organic polymeric shaped structure is oriented, heat-set polyethylene terephthalate film.

6. A product as in claim 3 wherein the organic polymeric shaped structure is polyvinyl chloride film.

7. A product as in claim 3 wherein the organic polymeric shaped structure is polyvinyl fluoride film.

8. A product as in claim 3 wherein the organic polymeric shaped structure is cellulose acetate film.

9. A product as in claim 3 wherein the organic polymeric shaped structure is a polyoxymethylene shaped structure.

10. An organic polymeric film having accumulated therein and adjacent to at least one surface thereof to a penetration of not more than about 20% of the thickness of said film from said surface, at least 0.4 gram per square meter of surface of said film of a substituted benzophenone derivative having the formula

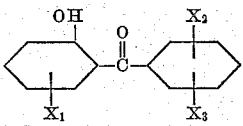

wherein $X_1$, $X_2$ and $X_3$ are each selected from the group consisting of hydrogen, hydroxy, alkyl, alkoxy and halogen.

11. An organic polymeric film at least 0.5 mil thick having accumulated therein and adjacent to at least one surface thereof to a depth of not more than about 0.1 mil from said surface, at least 0.4 gram of a substituted benzophenone derivative having the formula

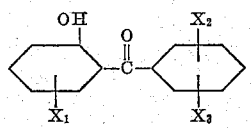

wherein $X_1$, $X_2$ and $X_3$ are each selected from the group consisting of hydrogen, hydroxy, alkyl, alkoxy and halogen.

12. A process for imparting resistance to degradation by ultraviolet light to an organic polymeric shaped structure which comprises the steps of applying to the surface of said structure a substituted benzophenone derivative having the formula

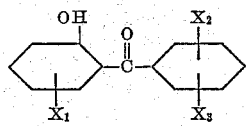

wherein $X_1$, $X_2$ and $X_3$ are each selected from the group consisting of hydrogen, hydroxy, alkyl, alkoxy and halogen; and thereafter heating the treated structure to a temperature above the melting point of said compound and below the melting point of said organic polymeric structure.

13. A process for imparting resistance to degradation by ultraviolet light to an organic polymeric film which comprises the steps of applying to the surface of said film a substituted benzophenone derivative having the formula

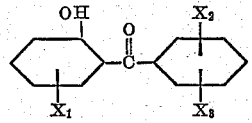

wherein $X_1$, $X_2$ and $X_3$ are each selected from the group consisting of hydrogen, hydroxy, alkyl, alkoxy and halogen; and thereafter heating the treated film to a temperature above the melting point of said compound and below the melting point of said organic polymeric film.

14. A process for imparting resistance to degradation by ultraviolet light to an organic polymeric film which comprises the steps of applying to the surface of said film a substituted benzophenone derivative having the formula

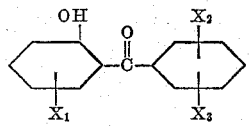

wherein $X_1$, $X_2$ and $X_3$ are each selected from the group consisting of hydrogen, hydroxy, alkyl, alkoxy and halogen; and thereafter heating the treated film to a temperature of about 115° C. to about 200° C. for at least 15 seconds.

15. A process for imparting resistance to degradation by ultraviolet light to an organic polymeric film which comprises the steps of applying to the surface of said film a mixture of 2,2'-dihydroxy-4,4'-dimethyoxybenzophenone and 2,2',4,4'-tetrahydroxybenzophenone; and thereafter heating the treated film to a temperature of about 115° C. to about 200° C. for at least 2 minutes.

16. A process for preparing polyethylene terephthalate film resistant to degradation by ultraviolet light which comprises the steps of elongating in at least one direction a polyethylene terephthalate film at least 2 times its original dimensions to a thickness of at least 0.5 mil; heating said elongated film to a temperature of about 150°–250° C. while restricting dimensional change; coating at least one surface of said film with at least 0.4 gram per square meter of each surface of said film thus coated of a substituted benzophenone derivative having the formula

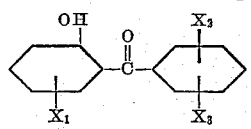

wherein $X_1$, $X_2$ and $X_3$ are each selected from the group consisting of hydrogen, hydroxy, alkyl, alkoxy and halogen from an aqueous dispersion thereof; heating the coated film to a temperature of about 115° C. to about 200° C. for a time sufficient for substantially all of said substituted benzophenone derivative to penetrate the surface of said film to a depth of not more than about 0.1 mil from said surface.

17. A process as in claim 12 wherein the substituted benzophenone derivative is applied to the surface of said structure from a solution.

18. A process as in claim 12 wherein the substituted benzophenone derivative is applied to the surface of said structure from a dispersion in water.

19. A process as in claim 12 wherein the substituted benzophenone derivative is applied to the surface of said structure as a powder.

20. A process as in claim 12 wherein the substituted benzophenone derivative is applied to the surface of said structure as a melt.

References Cited in the file of this patent

UNITED STATES PATENTS

| | | |
|---|---|---|
| 1,497,971 | Bock | June 17, 1924 |
| 2,129,131 | Hunter | Sept. 6, 1938 |
| 2,568,894 | Mackey | Sept. 25, 1951 |
| 2,614,940 | Freyermuth et al. | Oct. 21, 1952 |
| 2,693,492 | Hoch | Nov. 2, 1954 |
| 2,757,100 | Simril | July 31, 1956 |
| 2,915,416 | West | Dec. 1, 1959 |
| 2,917,402 | Sapper | Dec. 15, 1959 |